United States Patent
Coombs (10) Patent No.: US 12,404,859 B2
(45) Date of Patent: Sep. 2, 2025

(54) HIGH FREQUENCY TRANSFORMER FOR PREDICTING FAILURE OF AN ELECTRICAL SUBMERSIBLE PUMP SYSTEM

(71) Applicant: Leo Stephen Coombs, Bayfield, CO (US)

(72) Inventor: Leo Stephen Coombs, Bayfield, CO (US)

( * ) Notice: Subject to any disclaimer, the term of this patent is extended or adjusted under 35 U.S.C. 154(b) by 0 days.

(21) Appl. No.: 18/661,703

(22) Filed: May 12, 2024

(65) Prior Publication Data
US 2024/0384723 A1 Nov. 21, 2024

Related U.S. Application Data

(60) Provisional application No. 63/466,449, filed on May 15, 2023.

(51) Int. Cl.
| | | |
|---|---|---|
| F04D 15/00 | (2006.01) | |
| F04D 13/10 | (2006.01) | |
| H02K 5/132 | (2006.01) | |
| H02K 5/22 | (2006.01) | |

(52) U.S. Cl.
CPC ......... F04D 15/0088 (2013.01); F04D 13/10 (2013.01); H02K 5/132 (2013.01); H02K 5/225 (2013.01)

(58) Field of Classification Search
CPC ........ F04D 13/08; F04D 13/086; F04D 13/10; F04D 15/0077; F04D 15/0088; F04D 15/0281; H02K 11/26; H02K 11/27
See application file for complete search history.

(56) References Cited

U.S. PATENT DOCUMENTS

| | | | |
|---|---|---|---|
| 10,566,882 B2 * | 2/2020 | Grande | F04B 49/06 |
| 10,876,393 B2 * | 12/2020 | Rendusara | F04D 15/0088 |
| 12,160,146 B2 * | 12/2024 | Grande, III | F04B 17/03 |
| 2010/0169030 A1 * | 7/2010 | Parlos | G01R 31/343 702/58 |
| 2017/0077861 A1 * | 3/2017 | Dowhower | H01F 27/34 |
| 2018/0209252 A1 * | 7/2018 | Shanks | E21B 43/128 |
| 2020/0072228 A1 * | 3/2020 | Prine | H01F 30/12 |
| 2020/0321824 A1 * | 10/2020 | Selvaraj | H02P 25/022 |
| 2021/0054847 A1 * | 2/2021 | Badkoubeh | H02P 29/024 |
| 2021/0189805 A1 * | 6/2021 | Beck | F04B 47/06 |
| 2021/0408876 A1 | 12/2021 | Grande, III et al. | |

FOREIGN PATENT DOCUMENTS

WO WO-2024153315 A1 * 7/2024 ......... F04D 15/0088

OTHER PUBLICATIONS

Matos, Tiana (Authorized ISA Officer); International Search Report & Written Opinion mailed Jul. 26, 2024, for related PCT application PCT/US24/29017; and references cited therein.

* cited by examiner

*Primary Examiner* — Brian P Wolcott
(74) *Attorney, Agent, or Firm* — G. Michael Roebuck, PC (57) ABSTRACT

A 1-50 megahertz high frequency current transformer made from a PLA composite that predicts when an electric submersible pump system will fail. high frequency current transformer generates a 4-20 milliamp signal that indicates when the electric submersible pump system will fail.

12 Claims, 11 Drawing Sheets

Magnetic Iron PLA
Proto-Pasta Rustable Magnetic Iron Metal PLA Composite Is Actually
Ferromagnetic. It Responds To Magnets And Behaves Similarly To Pure Iron!
Encapsulated In Plastic, The Iron Maintains A Stable Matte, Cast Metal Finish
As Printed, But Can Be Rusted When Desired.
- Weighted Feel With 1.5x The Density Of Standard PLA
- Rustable To Create Modern Artifacts In A Few Easy Steps
- Attracts Magnets (Neodymium Type Recommended For Strongest Attraction)
- Induction At Magnetic Saturation About 0.15 Tesla
- Relative (To Air) Permeability Between 5 And 8 Independent Of Frequency Up To 1 Mhz
- Permeability-Between 62E-7 And 100E-7 H/m Independent Of Frequency Up To 1 Mhz Magnetic Iron PLA Is Slightly More Brittle Than Standard PLA And Requires Extra
Care When Handling. Magnetic Iron Filament Is More Abrasive Than Standard PLA
And May Require Nozzle Replacements And 1st Layer Adjustments.
(Try A Wear-Resistant And/Or Larger Diameter Nozzle For Increased Service
Intervals)

Material Properties

| Base Material | PLA |
|---|---|
| Characteristics | Low Odor, Non-Toxic Renewably Sourced Molecular Structure |
| Molecular Structure | Amorphous |
| Additives | Metal Powder |
| Max Particle Size | 250 Microns |
| Density | Approx 1.85 g/cc |
| Length | Approx 224 m/kg (1.75 mm) & 84 m/kg (2.85 mm) |
| Min Bend Diameter | 35 mm (1.75 mm) & 55 mm (2.85 mm) |
| Glass Transition (Tg) Onset | N/A |
| Melt Point (Tm) Onset | Approx. 155 deg C (310 deg F) |
| Max Use | N/A |

Use Limit Is Geometry, Load & Condition Dependent

Print Settings
(Based On Ultimaker s5 .15mm Profile)

| Nozzle Temperature [°C] | 192 |
|---|---|
| Heated Bed Temperature [°C] | 60 |
| Print Speed [mm/s] | 20-30 |
| Flow Rate/Extrusion Multiplier [%] | 100 |
| Extrusion Width [mm] | .65 (.05mm Larger Than Nozzle Size) |
| Volume Flow Rate [mm³/s] | 2-3 |

Results May Vary Based On Print Settings As Well As Print Quality
For A More In-depth Look At Magnetic Iron PLA Please View Proto-pasta.com/iron

FIG. 11

HIGH FREQUENCY TRANSFORMER FOR PREDICTING FAILURE OF AN ELECTRICAL SUBMERSIBLE PUMP SYSTEM

CROSS REFERENCE TO RELATED PATENT APPLICATIONS

This patent application claims priority from U.S. provisional patent application Ser. No. 63/466,449 filed on May 15, 2023, entitled A SYSTEM, METHOD, AND APPARATUS FOR MEDIUM TO VERY HIGH FREQUENCY CURRENT MONITORING by Leo Coombs, which is hereby incorporated by reference in its entirety.

BACKGROUND OF THE INVENTION

Electric submersible pump (ESP) failures are expensive to repair. There is a need for an apparatus that predicts ESP failure.

Field of the Invention

An apparatus that addresses failure phenomena in electric submersible pumps utilized in the oil industry with filtered pulse width modulated variable frequency drives.

SUMMARY OF THE INVENTION

A predictive signal generator for predicting electric submersible pump failure having a high frequency current transformer; a signal converting circuit connected to an output of the current transformer; a voltage divider connected to an output of the signal converting circuit; a voltage to current signal converter connected to an output of the voltage divider; and a local high frequency current indicator display used to predict ESP system failure. The high frequency current transformer is formed out of a magnetic iron metal Proto-pasta Rustable Magnetic Iron Metal PLA Composite (PLA) composite.

BRIEF DESCRIPTION OF THE DRAWINGS

The drawings presented herein are for illustrative purposes only and do not limit the scope of the claims. Rather, the drawings are intended to help enable one having ordinary skill in the art to make and use the claimed inventions. The drawings are drawn to scale.

FIG. 7 is a specification sheet for the current transformer material used in particular illustrative embodiment of the invention;

DETAILED DESCRIPTION OF A PARTICULAR ILLUSTRATIVE EMBODIMENT OF THE INVENTION

A detailed description of a particular illustrative embodiment of the invention will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist with the description and to provide a visual representation of certain aspects of the subject matter described herein. The figures are not all necessarily drawn to scale, nor do they show all the structural details, nor do they limit the scope of the claims.

In a particular illustrative embodiment of the invention, a medium frequency to very high frequency (1-100 megahertz) current transformer and monitor are provided. A particular illustrative embodiment of the invention provides electronic analog current monitor data gathered from a high frequency current transformer (1-100 megahertz) for monitoring and predicting an Electrical Submersible Pump (ESP) (degradation and failure) and power conductor insulation integrity impairment (degradation and failure) used for predicting electric motor failure in an ESP when the ESP is powered by a filtered pulse width modulated adjustable speed drive. The term medium to very high frequency is based on the standard definitions of radio frequencies. The "predictive phenomenon" that in a particular illustrative embodiment, the apparatus and method provide a high frequency current transformer used to monitor typically occurs usually around 1-50 Mega Hertz (MHz) depending on the resonance of the individual ESP and power supply circuit and as high as 50 MHz in the case of partial discharge. In another particular illustrative embodiment of the high frequency current transformer has a limit of 100 MHz. A particular illustrative embodiment of the invention is primarily marketed for ESPs in oil wells, but its application could be for any motor powered by a FPWM ASD (Filtered Pulse Width Modulated Adjustable Speed Drive) or a Pulse Width Modulated Adjustable Speed Drive (PWM ASD). A function block diagram (FIG. 1) of the circuit is provided.

In a particular illustrative embodiment of the invention, a specifically designed current transformer is 3D printed form a commercially available Proto-pasta Rustable Magnetic Iron Metal PLA Composite (PLA) material that is 3 dimensionally printed into a tube shaped cylindrical current transformer core having a single layer winding. The 3D printable PLA material is available from supplier Protoplant, Inc., Makers of Protopasta, 12001 NE 60th Way, Suite B-2, Vancouver, WA 98682, info@protoplant.com. Instructions for 3d printing the PLA material are also available from the supplier, Protoplant, Inc. The single layer winding is wound circumferentially around an outside surface of the PLA current transformer core around a longitudinal axis of the cylindrical tube shaped high frequency current transformer core made of the PLA. The output of the PLA transformer core winding is electrically coupled to a printed circuit board and that is potted within a reusable mold to form a current transducer. A front panel is provided of easy-to-read in any sunlight level analog gauges, and analog (4-20 mA) outputs that are brought into a site's supervisory control and data acquisition system for monitoring the output from the current transducer. A system operator monitors the display to predict impending failure of the ESP system, the ESP system including to not limited to the ESP stator windings, ESP bearing and the insulation of the power supply conductors supplying power to the ESP from a FPWM ASD power supply.

In a particular illustrative embodiment of the invention, a hardware-only, analog-electronic device specifically addresses failure phenomena in electric submersible pumps utilized in the oil industry with filtered pulse width modulated adjustable speed drives. In these installations, there are typically two primary predictive indicators or "predictive phenomenon" of failure of an ESP. In another particular embodiment of the invention, a processor 101, non-transitory computer readable medium 105 containing artificial intelligence software 103 stored on the computer readable medium are provided to monitor the output of the high frequency current transformer and automatically predict ESP system failure. These two ESP system failure predictive indicators output to the on the 4-20 ma display and monitored by the processor are 1) partial discharge and 2) current flow through the circuit of the switching transients from the FPWM ASD, through power supply conductors to the ESP. These two primary predictive ESP system failure indicators can occur in a similar frequency band and are virtually identical in form. There are, however, primarily observed differences between these two primary predictive ESP failure indicators, in that the partial discharge presents a distinct attack and decay in its transient profile and has no correlation with a FPWM ASD switching transients as opposed to the switching transients that are coupled to the FPWM ASD switching transients and present a summation of decay transients as the switching transient decays through multiple circuits of resonance in the ESP system.

As the integrity of the ESP system, including but not limited to, insulation of the FPWM ASD power supply conductors to the ESP and the ESP motor, bearings and other ESP components in the ESP circuit progresses over time through impairment and degradation to eventual failure, the ESP circuit, including the ESP motor, bearings and power conductors' insulation presents progressively diminishing impedance to the FPWM ASD switching transients. Thus, the magnitude of the current associated with these continuous events (partial discharge and current flow through the circuit due to FPWM ASD switching transients) steadily increases over time and is used as a predictive indicator of impairment and degradation and eventual failure of an ESP system including but not limited to the ESP motor, ESP bearings and FPWM ASD power supply conductors' insulation. Partial discharge is a separate phenomenon that also occurs due to impairment and degradation of the power supply conductor insulation and ESP power conductor insulation and ESP motor and bearings and is a known predictive indicator of progressive ESP system failure. Both of these phenomena are monitored in a particular illustrative embodiment of the invention and are displayed as a sum total effect of the current impairment and degradation of the insulation of the power supply conductors and ESP system.

In the past, the state-of-the-art equipment for detecting excessive magnitude in the FPWM ASD carrier frequency has proven to be insufficient in predicting ESP system failures. Past methods of continuous monitoring have relied on the calculation of total harmonic distortion and utilize technology that is unable to be incorporated into the small periods typical of the high carrier frequencies implemented in filtered pulse width modulated adjustable speed drives for ESP systems in oil wells. In the past, non-continuous methods of monitoring relied on 'snapshots' taken with expensive oscilloscopes but that are only able to allow a human subject matter expert to analyze the current integrity of the insulation.

In a particular illustrative embodiment of the invention a high frequency PLA transformer core receives the high frequency predictive indicator current from the power supply conductor and converts it into a corresponding direct current voltage signal which is then passed through an adjustable voltage divider and then converted into a scalable 4-20 mA signals 918a, 918b and 918c, that are readily integrated with standard automation systems for monitoring. In a particular illustrative embodiment of the invention, a visible display panel on the apparatus provides this 4-20 milli ampere signal information in analog gauges that are easy to read by field personnel and not prone to the failures due to sun exposure a typical of liquid crystal display (LCD) and touchscreens.

In a particular illustrative embodiment of the invention provides for continuous monitoring of the predictive 4-20 mA signal and the cost of the system of the present invention is comparable to the cost of a one-time analysis by a subject matter expert. The intent being that a particular illustrative embodiment of the invention is installed on every ESP system to maximize system up-time and production.

In the past, the state-of-the-art equipment for detecting excessive magnitude in the switching transient frequency typically involves measuring the current to ground which is very generalized and too broad to use as a basis for failure prediction. Moreover, the high frequency and short duration of the specific transients requires an oscilloscope with a sample period of approximately 10 ns, or less, and a subject matter expert for analysis. The sample rates required of the oscilloscopes for this analysis makes them comparatively expensive.

The past methods of monitoring for partial discharge utilize capacitors or high frequency current transformers and analysis software. These methods are prohibitively expensive for any, but critical applications and do not monitor the effect of the FPWM switching transients.

While a particular illustrative embodiment of the invention would primarily be marketed for application in ESP systems, it would have applicability, with slight modifications, to any industry using electric motors and could potentially compete with current partial discharge monitoring devices.

In a particular illustrative embodiment of the invention a high frequency current transformer is provided and is referred herein as an XRHFCT (exclusively Reactive High Frequency Current Transformer, wherein the transformer core is made from PLA). The addition of the signal converting printed circuit board (PCB) makes the combination of the XRHFCT and PCB a high frequency current transducer. In a particular illustrative embodiment, the system uses a novel current transformer design using a specialty 3-dimensionally printable core PLA material (see spec sheet FIG. 7). The XRHFCT is especially reactive to these frequencies (1-2 megahertz and 50-100 megahertz) that are not detected by most current transformers. The XRHFCT feeds into PCB board (see FIG. 3) to boost and rectify the medium to high frequency current into a corresponding DC voltage signal. The XRHFCT be easily resized for application in other industries.

Figure 1:
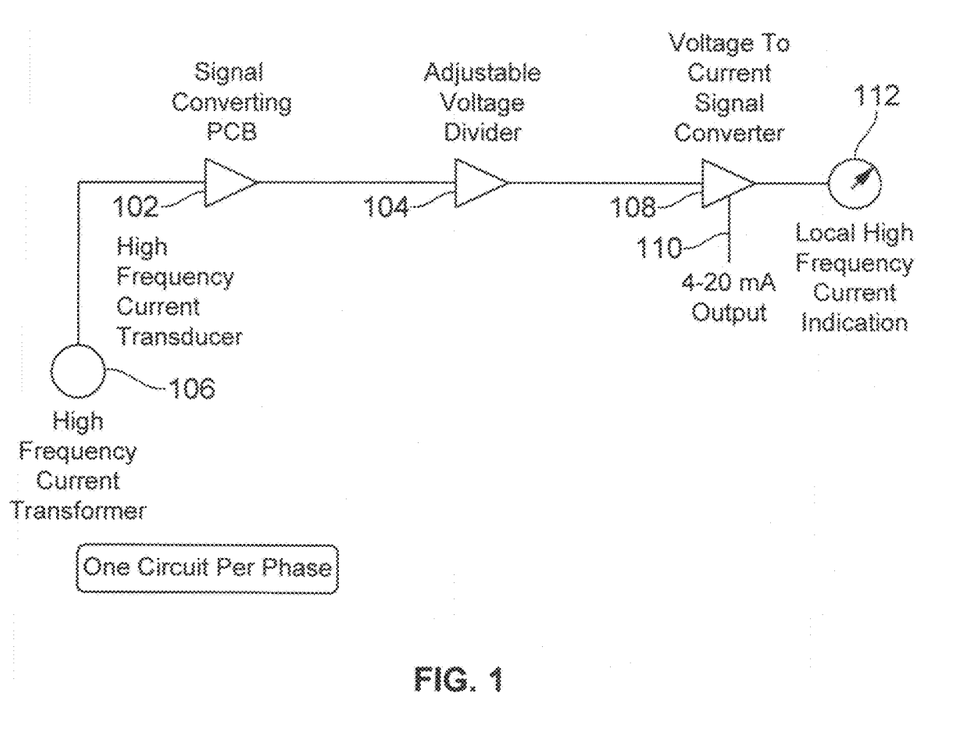
FIG. 1 is functional block diagram of illustrative embodiment a particular of the invention.

Turning now to FIG. 1, FIG. 1 is a functional block diagram of illustrative embodiment a particular of the invention. In a particular illustrative embodiment of the invention, as shown in FIG. 1, one circuit as shown in FIG. 1 is provided per phase of the three phases of power provided from a FPWM ASD to an ESP. Each FPWM ASD output phase is passed through or adjacent to a high frequency current transformer 106. In a particular illustrative embodiment the high frequency current transformer is an XRHFCT. The signal from the XRHFCT 106 is electrically connected to an input of a signal converting PCB 102 (see FIG. 7). An output from the signal converting PCB 102 is sent to an input of an adjustable voltage divider 104. An output from the adjustable voltage divider is sent to an input of a voltage to current signal converter 108. A 4-20 mA output 110 is provided by the voltage to current signal converter. The output of the voltage to current signal converter is sent to a local high frequency indicator display 112.

Figure 2:
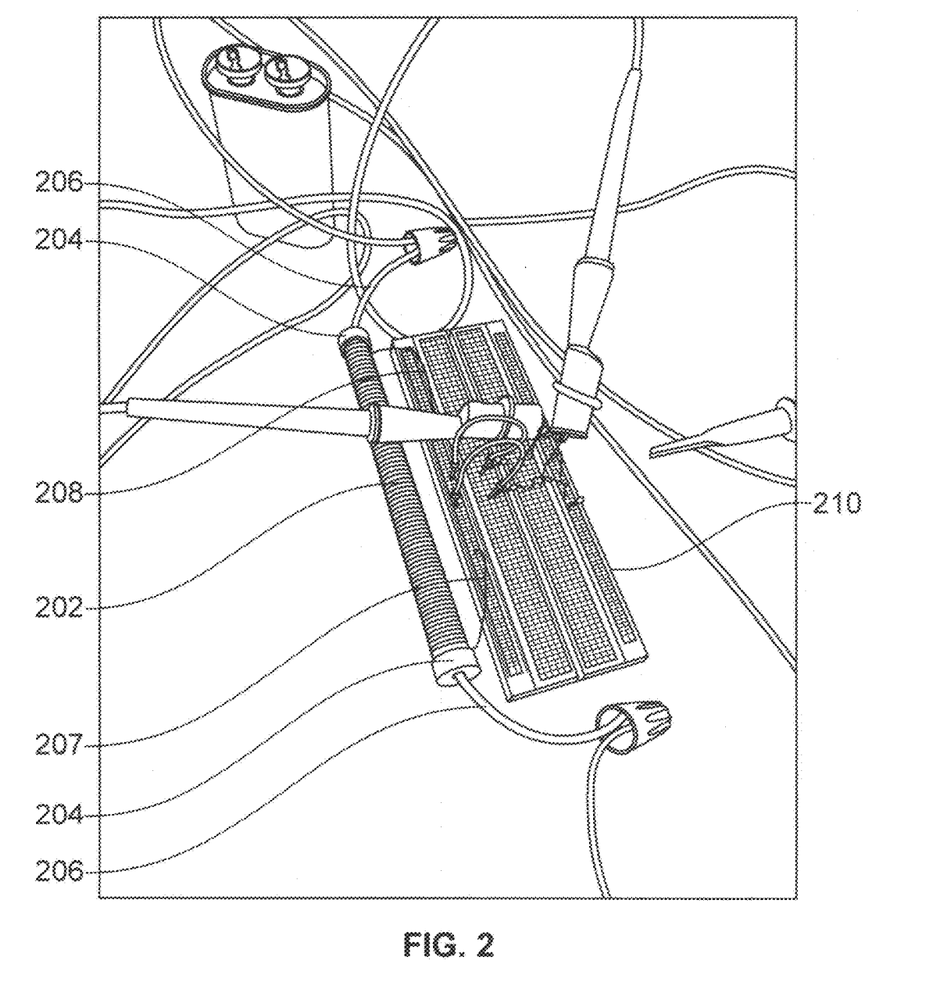
FIG. 2 is side view of a current transformer illustrative embodiment a particular of the invention.

Turning now to FIG. 2, FIG. 2 is a top view of a bread board implementation of a high frequency current transformer and monitor in a particular illustrative embodiment. In a particular illustrative embodiment of the invention as shown in FIG. 2, each phase 206 of FPWM ASD power supplied to an ESP is run through or adjacent to an XRHFCT 204 high frequency current transformer, formed as a tubular PLA cylindrical core with transformer wire 202 wound in a single layer around the circumference of the XRHFCT. Each end of the transformer wire 207 and 208 are electrically connected to circuit 210, shown in FIG. 2 as a breadboard implementation of the circuit. In another particular embodiment of the invention the high frequency transformer core is any material that is capable of sensing a 1-50 megahertz electromagnetic field. In another particular embodiment of the invention the high frequency transformer core is any material that is capable of sensing a 1-100 megahertz electromagnetic field.

Figure 3:
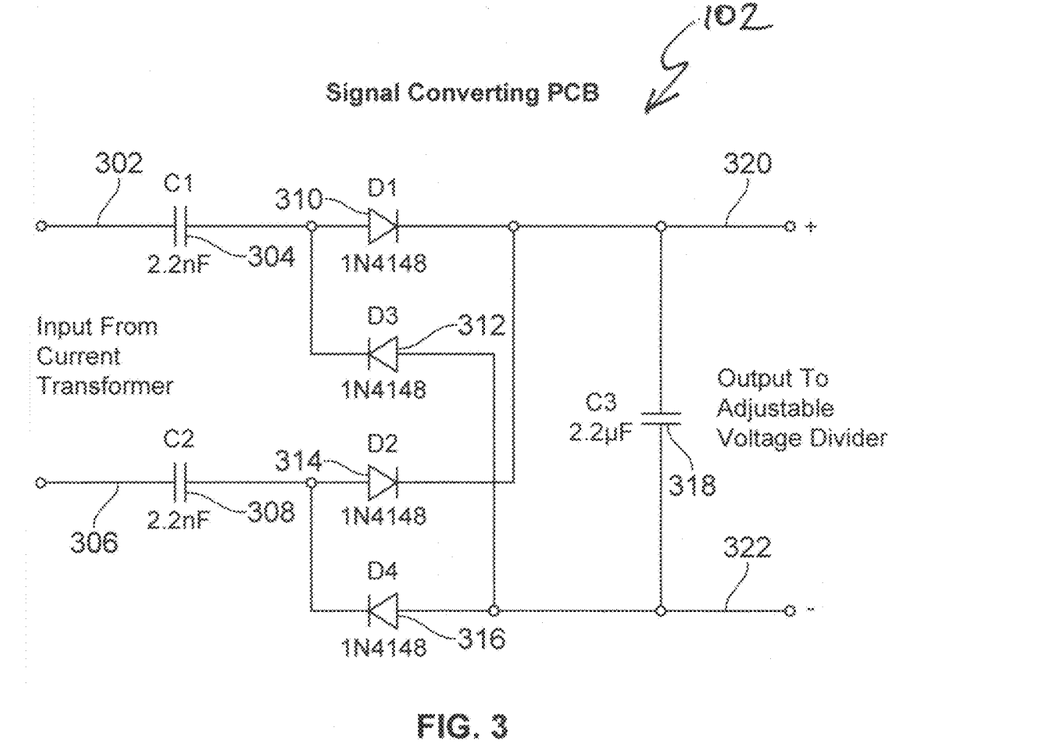
FIG. 3 circuit diagram of a signal converting printed circuit board in an illustrative embodiment a particular of the invention.

Turning now to FIG. 3, FIG. 3 circuit diagram of a signal converting printed circuit board (PCB) (102) in an illustrative embodiment of a particular of the invention. In a particular illustrative embodiment of the invention the current transformer, shown as a XRHFCT, provides a signal that is applied to the inputs 302 and 306 of the signal converting PCB. Input 302 is electrically connected to capacitor C1 304 and input 306 is electrically connected to capacitor C2 308. The outputs of capacitors C1 and C2 are electrically connected to diode network formed by diode D1 310, diode D2 314, diode D3 312 and diode D4 316. Capacitor 318 is attached between the outputs 320 and 322 of the signal converting PCB.

Figure 4:
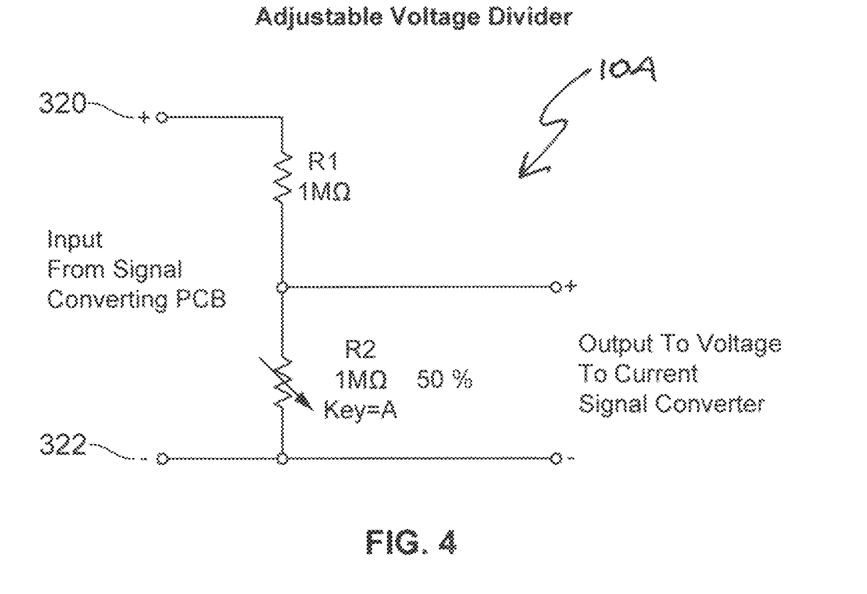
FIG. 4 is a side view an adjustable voltage divider in a particular illustrative embodiment of the invention.

Turning now to FIG. 4, in a particular illustrative embodiment of the invention, a voltage divider 104 is provided in more detail as shown in FIG. 4. The voltage divider takes the output from the signal converting PCB and provide an output to the voltage to current signal converter 108.

Figure 5:
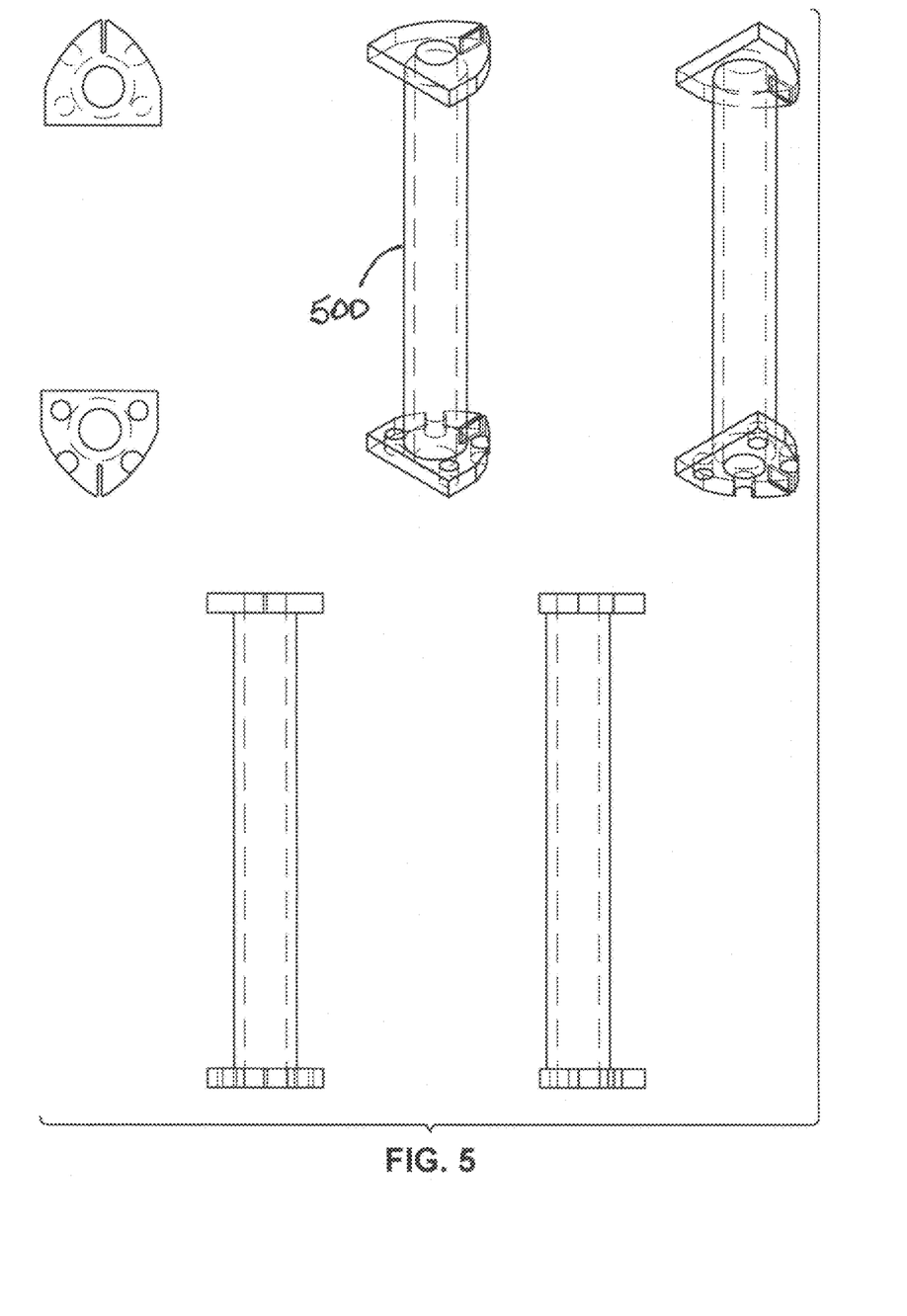
FIG. 5 is a mechanical drawing of high frequency current transformer in a particular illustrative embodiment of the invention.
Figure 6:
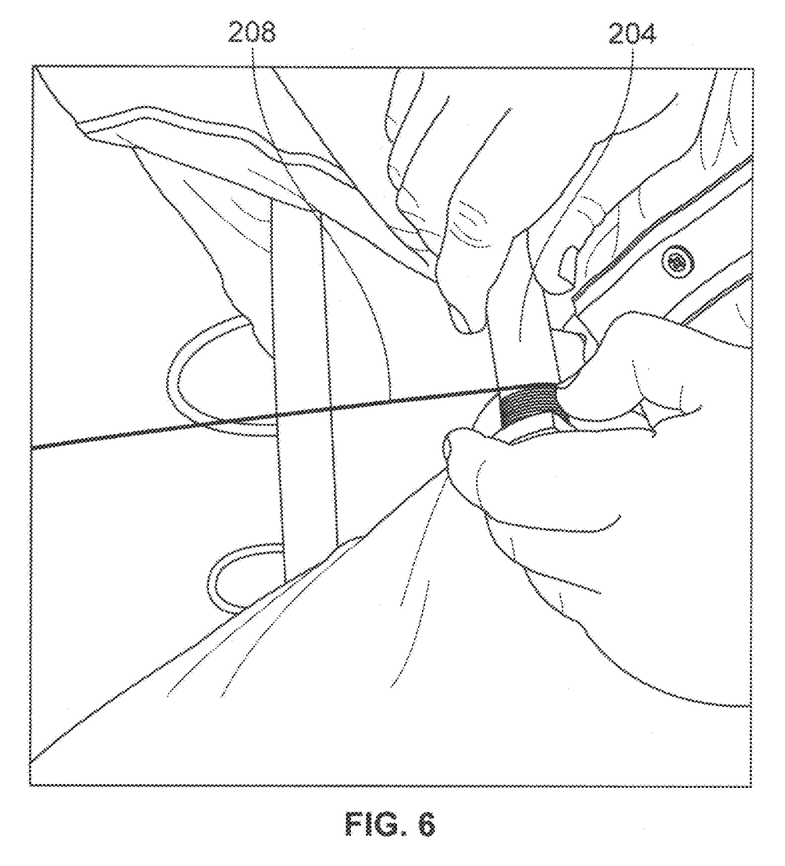
FIG. 6 is side view of the current transformer single layer windings wound onto the high frequency current transformer.

Turning now to FIG. 5, FIG. 5 is a mechanical drawing of the XRHFCT current transformer in a particular illustrative embodiment of the invention. This drawing is drawn to scale, however, the dimensions can be changed, enlarged, or reduced to accommodate a particular application. Turning now to FIG. 6, in a particular illustrative embodiment of the invention, the tubular transformer core XRHFCT, the transformer wire is wound in a single layer on the current transformer core as shown in FIG. 6.

Turning now to FIG. 7, in a particular illustrative embodiment of the invention the XRHFCT tubular current transformer core is made from Proto-pasta Rustable Magnetic Iron Metal PLA Composite (also referred to herein as "PLA") is actually ferromagnetic. In a particular illustrative embodiment of the invention, the XRHFCT current transformer core is formed out of PLA using a 3D printer. The PLA material responds to magnets and behaves similarly to pure iron according to the manufacturer's specification sheet shown in FIG. 7. Encapsulated in plastic, the iron maintains a stable matte, cast metal finish as printed, but can be rusted when desired. In another particular embodiment of the invention, the transformer core is rectangular, triangular, or another non-cylindrical shape capable of sensing 1-50 megahertz electromagnetic field. In another particular embodiment of the invention, the transformer core is rectangular, triangular, or any shape capable of sensing 1-100 megahertz electromagnetic field. In another particular illustrative embodiment of the invention, the transformer core is capable of sensing an electromagnetic field from 40-50 megahertz.

Figure 8:
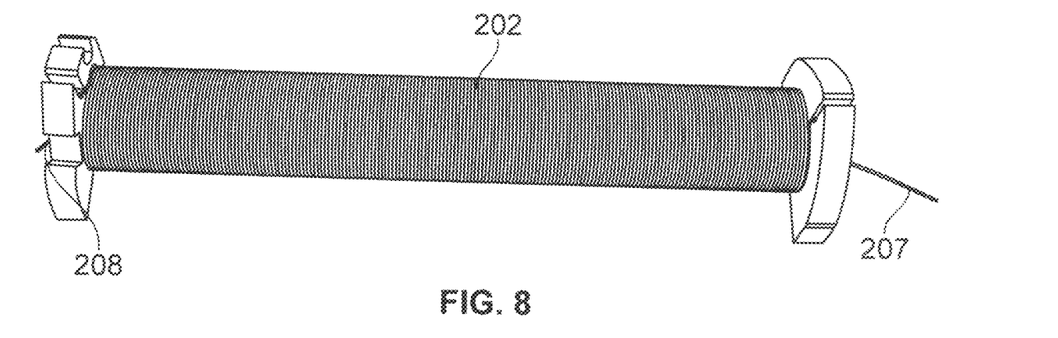
FIG. 8 is a side view of a single layer wound current transformer in a particular illustrative embodiment of the invention.

FIG. 8 is a side view of a wound current transformer in a particular illustrative embodiment of the invention.

Figure 9:
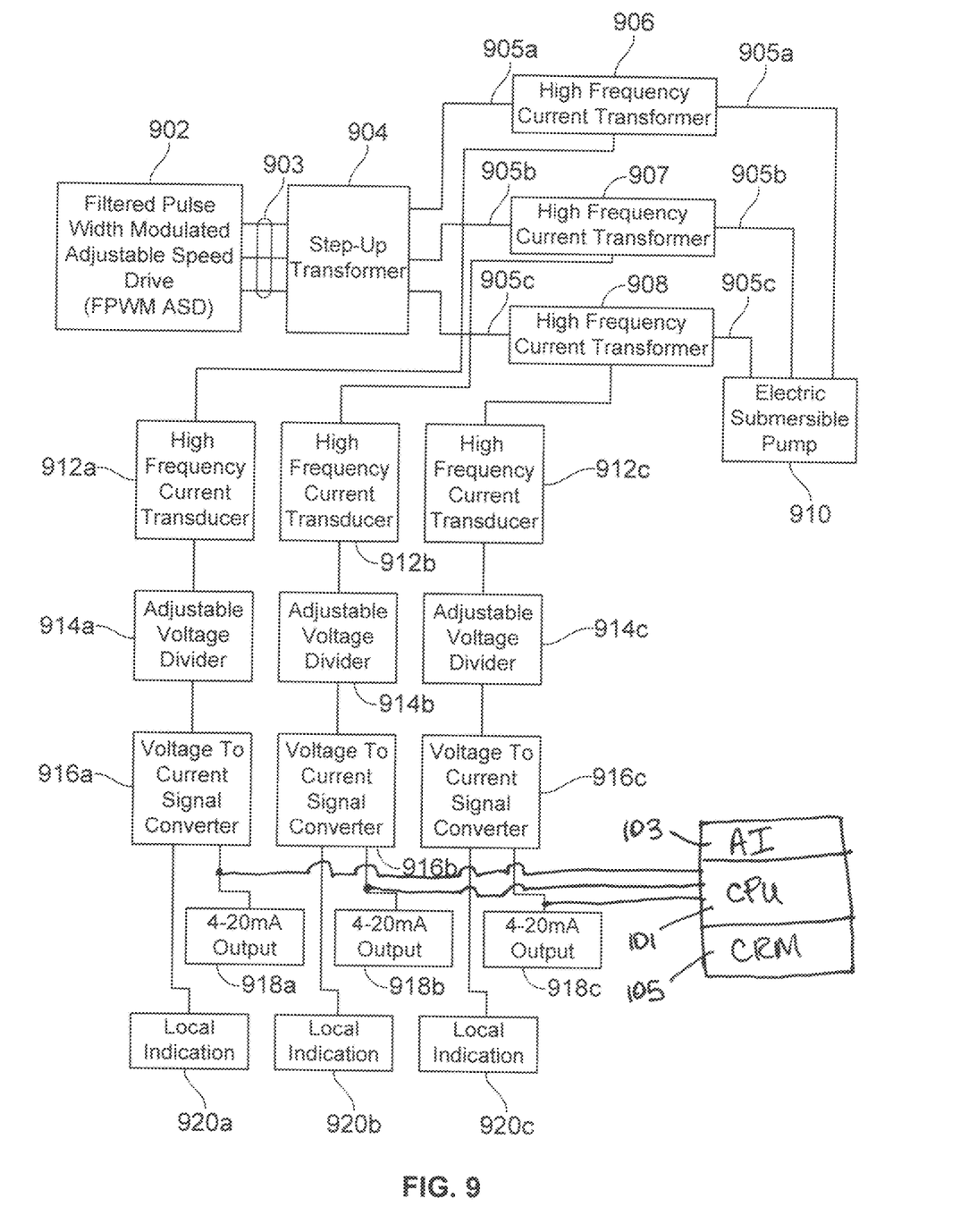
FIG. 9 is a system diagram of a particular illustrative embodiment of the invention.
Figure 10:
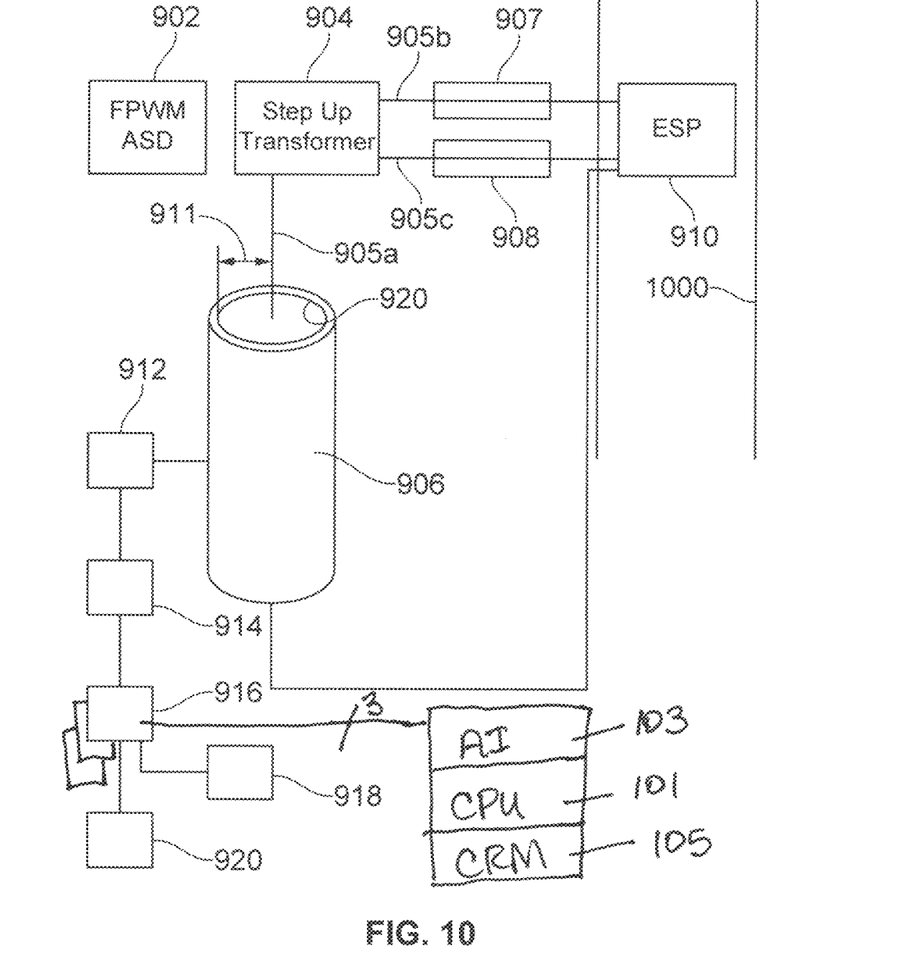
FIG. 10 is a system diagram showing the proximity of a current transformer surrounding each of three phase power supply conductors.
Figure 11:
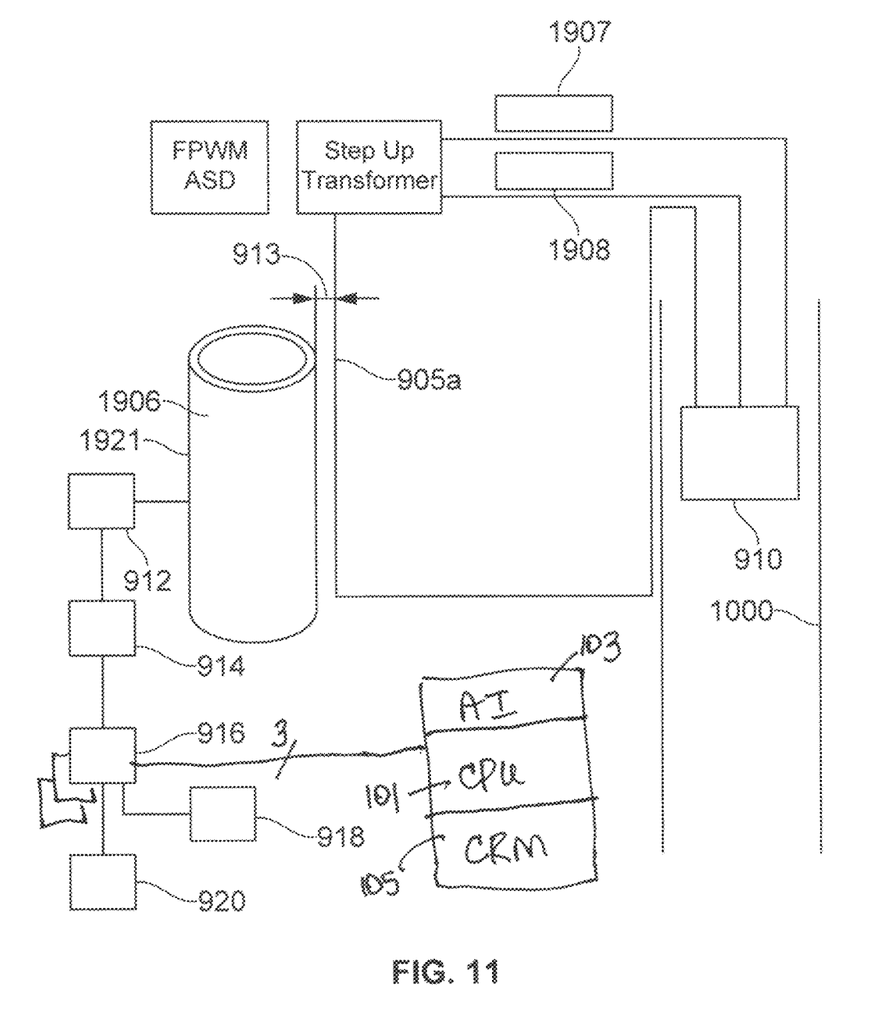
FIG. 11 is a system diagram showing the proximity of a current transformer adjacent to each of three phase power supply conductors.

FIG. 9 is a system diagram of a particular illustrative embodiment of the invention. As shown in FIG. 9. As shown in FIG. 9, a filtered pulse width adjustable speed drive (FPWM ASD) 902 feeds three phase power 903 to a step up transformer 904. The step-up transformer feeds three phase power through power conductors 905a, 905b and 905c to the ESP 910 wherein the ESP is deployed down hole at an oil rig installation in a borehole 1000. A high PLA frequency current transformer (906, 907, 908) is positioned surrounding (as shown in FIG. 10) or adjacent to (as shown in FIG. 11) each phase conductor 905a, 905b and 905c of the output from the step-up transformer. Each one of the high frequency current transformers are electrically connected to a high frequency current transducer 912a, 912b, 912c. Each high frequency current transducer is electrically connected to an input of an adjustable voltage divider 914a, 914b, 914c. Each output from the adjustable voltage divider 914a, 914b, 914c is connected to voltage to current signal generator 916a, 916b, 916c. Each voltage to current signal generator 916a, 916b, 916c outputs a 4-20 milli ampere signal. Each voltage to current signal generator 916a, 916b, 916c output is connected to a local indication 920a, 920b, 920c. As shown in FIG. 9, a processor 101, non-transitory computer readable medium 105 containing artificial intelligence software 103 stored on the computer readable medium are provided to monitor the output of the high frequency current transformer and automatically predict ESP system failure.

Turning now to FIG. 10, in a particular illustrative embodiment of the invention, the criticality of proximity of the high frequency transformer core to the power wire to the ESP is depicted. The ESP is depicted deployed into a borehole 1000 that is bored into the surface of the Earth. The electrical current waveform flowing through the FPWM ASD power supply conductors 905a, 905b and 905c to the ESP produces an electromagnetic field wherein an output from the high frequency transformer is a summation of each of the predictive electromagnetic waveform components (partial discharge and current flow through the ESP circuit due to FPWM ASD switching transients). These waveform components are defined by their individual frequency, and their corresponding magnitude demonstrate their effect on different aspects of the ESP circuit health and predicted degradation. The present invention provides a PLA current transformer that resonates and thus is responsive with a waveform component picked up from the power supply conductor electromagnetic field that occurs in the 1-50 megahertz range and is an indicator of progressive degradation and predicted eventual failure in ESP systems. In a particular embodiment of the invention the electromagnetic field frequency, at sufficient magnitude, creates an electromagnetic field around the power conductors supplying power to the ESP. The PLA current transformer core material resonates with the power conductor electromagnetic field frequency which is picked up by the coil of the high frequency current transformer. The current transformer core must be suitably close to the power conductor such that it is within the electromagnetic field emanating from the power conductor. For this reason, in a particular illustrative embodiment of the invention, the current transferor core is preferably no more than 0.25 inches away from the power conductor to the ESP. As shown in FIG. 10, a processor 101, non-transitory computer readable medium 105 containing artificial intelligence software 103 stored on the computer readable medium are provided to monitor the output of the high frequency current transformer and automatically predict ESP system failure.

Each of the three current transformers 906, 907 and 908 should be positioned no more than 0.25 inches away 911 from the power conductor with which it is associated. This is why the cross-section of the core cannot be too large when surrounding the FPWM ASD power supply conductor or the internal surface of the transformer core would be too far away from the conductor and outside a detectable range of the electromagnetic field emanating from the power conductor. This is accomplished either with the current transformer tube surrounding the ESP power conductor as shown in FIG. 10 or adjacent to the power conductor as shown in FIG. 11. As shown in FIG. 10, the core preferably has an inside diameter dimension so that the interior surface 920 of the coil 906 inside diameter so that the core interior surface 920 is no more than 911 0.25 inches from the power conductor 905a. In an alternative illustrative embodiment of the invention, as shown in FIG. 11, small-diameter current transformer cores 1906, 1907, 1908 are placed alongside and adjacent to each of the ESP power conductors so that the external surfaces 1921 of the transformer cores is preferably no more than 0.25 inches 913 away from the power conductor, 0.545 inches diameter for the small-diameter cylinder. The electromagnetic field emanating from the power conductor electromagnetic does not have a defined limit but diminishes in magnitude rapidly over distance. Thus the transformer core is preferably within 0.25 inches away from the power conductor. As shown in FIG. 11, a processor 101, non-transitory computer readable medium 105 containing artificial intelligence software 103 stored on the computer readable medium are provided to monitor the output of the high frequency current transformer and automatically predict ESP system failure.

In a particular illustrative embodiment of the invention, a one-layer winding of the pickup coil generates a cleaner signal with less electrical noise, than a multi-layer winding on the core for conversion by the signal converting PCB. The signal picked up by the single layer pickup coil is a high frequency waveform of varying magnitude. This predictive signal from the current transformer is picked up by the high frequency transformer, isolated, rectified, amplified and displayed. Multiple layers of wire around the pickup coil creates turn to turn capacitance which could allow reduction in high frequency magnitude and/or multiplication of the frequency in a multi-layer winding. Reduction in the high frequency magnitude could cause a false low-level output. Multiplication of the frequency in a multi-layer transformer core winding could impede the function of the rectification in the PCB. Thus the single layer coil winding is preferred.

In a particular illustrative embodiment of the invention, the transformer coil wire wrapped around the PLA transformer core is 24 American wire gauge copper magnet wire. It is currently wound by hand but will be wound by machine. In a particular illustrative embodiment of the invention, the current transformer core has an internal diameter of 0.545 inches. The internal diameter of the current transformer core can be larger or smaller than 0.545 inches. The length of the current transformer core is proportional to the output of the current transformer. In a particular illustrative embodiment of the invention the current transformer core is 6 inches long, but core length can be longer or shorter. If the current transformer core length is shortened, the output of the coil around the core decreases and if the current transformer core length is increased, the output of the coil around the longer transformer core is increased.

As shown in FIG. 10 and FIG. 11, in a particular illustrative embodiment of the invention, the current transformer surface is within 0.25 inches 913 of a phase of a 3-phase power supply conductor which it surrounds as shown in FIG. 10 and within 0.25 inches of a 3-phase power supply conductor to which it is placed adjacent As shown in FIG. 11. The ESP is placed in a wellbore 1000 bored into the surface of the Earth.

In an example scenario, the monitored output that outputs values from 4-20 milliamps, would start with an initial value at approximately 7 milliamps when the ESP circuit and power conductor insulation supplying power to the ESP is new and no degradation has occurred, neither in the power supply conductor ESP circuit, including but not limited to the ESP motor stator and bearings, nor the power conductor insulation. ESP system failure either in the ESP circuit or the power supply conductor occurs when the monitored output reaches approximately 14 milliamps. Thus when the monitored output reaches 12 milliamps, it is predicted that the ESP circuit and cable will fail and should be replaced.

This also indicates that the power conductor is degraded and should not be used again. In an alternative embodiment of the invention artificial intelligence is used to train on the monitored output to predict a failure date based on training the AI on the monitored output and the exact value at the point of failure at a particular oil well (oil rig) installation. Each installation will vary as to what the value of the output of the high frequency transformer when ESP system failure occurs and thus the AI is trained on each individual oil rig installation based on a value of the output of the high frequency transformer when ESP system failure occurs. When the conductor or the ESP fails the monitored output drops below the initial 7 milliamp reading, down to approaching 4 milliamps.

Each of the appended claims defines a separate invention which, for infringement purposes, is recognized as including equivalents of the various elements or limitations specified in the claims. Depending on the context, all references below to the "invention" may in some cases refer to certain specific embodiments only. In other alternative embodiments of the invention, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

Certain specific embodiments of methods, structures, elements, and parts are described below, which are by no means an exclusive description of the inventions. Other specific embodiments, including those referenced in the drawings, are encompassed by this application and any patent that is issued therefrom.

The invention claimed is:

1. A system for predicting failure of an electric submersible pump system (ESP), the system comprising:
    a pulse width modulated adjustable speed drive electrical power supply having at least one electrical conductor power supply conductor for supplying power to an electric submersible pump;
    insulation surrounding the power supply conductor;
    a high frequency current transformer core placed adjacent to the at least one electrical power supply conductor, wherein the high frequency current transformer core resonates at a frequency of an electromagnetic field emanated the at least one electrical power supply conductor;
    an output from the high frequency current transformer core, wherein the output is indicative of a magnitude of the electromagnetic field emanated from the at least one electrical power supply conductor; and
    a high frequency current indicator that provides an output from the current transformer core that indicates a magnitude of the electromagnetic field emanated from the electrical conductor for predicting failure of the electric submersible pump system.

2. The system of claim 1, wherein the high frequency current transformer is formed out of a magnetic iron metal PLA composite material.

3. The system of claim 1, wherein the output from the high frequency current transformer ranges from 4 to 20 milliamps, wherein the output from the high frequency is 7 milliamps when the electric submersible pump system is not degraded and is 14 milliamps when system failure occurs in the electric submersible pump, so that a reading of 12 milliamps indicates that the electric submersible pump system needs to be replaced before it fails.

4. The system of claim 2, wherein the high frequency core is wrapped with a single layer winding.

5. The system of claim 1, wherein the high frequency current transformer core is within 0.25 inches away from the electrical power supply conductor.

6. The system of claim 1, wherein the high frequency current transformer core has an internal diameter, wherein the internal diameter of the core surrounding the electrical supply conductor is within 0.25 inches of the electrical conductor.

7. The system of claim 1, wherein the high frequency current transformer core has a cylindrical shape.

8. The system of claim 1, wherein the high frequency current transformer core has a non-cylindrical shape.

9. The system of claim 1, wherein the high frequency current transformer resonates with an electromagnetic magnetic field emanated from the electrical power supply conductor up to at least 50 megahertz.

10. The system of claim 1, wherein the power supply further comprises a three conductor three phase power supply, wherein a single high frequency current transformer is placed adjacent to each of the three electrical power supply conductors.

11. The system of claim 1, further comprising:
    a high frequency current transducer that converts a current from the high frequency current transformer to an output voltage that is monitored to predict ESP system failure.

12. The system of claim 1, further comprising:
    a processor that monitors the output from the high frequency current transformer core that indicates a magnitude of the electromagnetic field emanated from the electrical conductor for predicting failure of the electric submersible pump system; and
    a computer readable medium containing an artificial intelligence software module that predicts when failure of the electric submersible pump system will occur based on the output from the high frequency transformer core, wherein the artificial intelligence is trained on failures of ESP systems on an oil rig installation and predicts when a failure of the ESP system will occur.

* * * * *